United States Patent [19]
Norrie et al.

[11] Patent Number: 5,214,999
[45] Date of Patent: Jun. 1, 1993

[54] ZIG-ZAG PATH PROCESSING FACILITIES

[75] Inventors: Lyle W. Norrie, Etobicoke; Torben Madsen, Weston; Ping F. Wu, Willowdale, all of Canada

[73] Assignee: Knud Simonsen Industries Limited, Rexdale, Canada

[21] Appl. No.: 860,067

[22] Filed: Mar. 30, 1992

[51] Int. Cl.⁵ .................... A23L 3/00; A23L 3/04; B65G 47/00
[52] U.S. Cl. ...................... 99/330; 99/355; 99/362; 99/404; 99/427; 99/443 C; 99/470; 99/478; 134/62; 134/72; 134/126; 198/475.1; 198/797; 198/952
[58] Field of Search ............ 99/352, 355, 326, 330, 99/334, 359–362, 367, 370, 373, 386, 404, 427, 443 C, 470, 477, 478, 536; 134/48, 62, 67, 68, 71, 72, 126; 198/485.1, 486.1, 475.1, 792, 952; 422/296, 297, 304

[56] References Cited

U.S. PATENT DOCUMENTS

| | | | |
|---|---|---|---|
| 669,250 | 3/1901 | Birkholz | 99/362 |
| 1,419,139 | 6/1922 | Hunter | 99/330 |
| 1,757,732 | 5/1930 | Pade | 198/797 |
| 1,968,751 | 7/1934 | Enock | 99/362 |
| 2,981,401 | 4/1961 | Cumming | 134/72 |
| 3,350,224 | 10/1967 | Sadwith | 134/62 |
| 3,699,875 | 10/1972 | Wilson | 99/362 |
| 3,770,107 | 11/1973 | Michelbach | 198/803.14 |
| 4,168,776 | 9/1979 | Hoeboer | 198/797 |
| 4,385,035 | 5/1983 | Akitoshi et al. | 422/297 |
| 5,161,457 | 11/1992 | Evans | 99/443 C |

FOREIGN PATENT DOCUMENTS

| | | | |
|---|---|---|---|
| 1962428 | 6/1971 | Fed. Rep. of Germany | 99/361 |
| 3108470 | 5/1991 | Japan | 99/362 |
| 0598816 | 3/1978 | U.S.S.R. | 198/486.1 |

Primary Examiner—Timothy F. Simone

[57] ABSTRACT

A processing facility, for subjecting products to process conditions for lengths of time and having a processing chamber equipped for establishing a predetermined condition within and throughout the chamber, a pair of continuous flexible conveyor elements, extending through the chamber along a generally zig-zag pathway, rotatable bearing members for supporting the flexible elements in predetermined lengths, spaced one above the other, and spaced apart from one another, the flexible elements being extended around respective bearing members, in a generally zig-zag fashion, product supports extending between the flexible elements, attachments at each end of the products supports for attachment to respective flexible elements, so that the product supports are freely swingably supported between the flexible elements, and the rotatable bearing members being spaced apart on opposite sides of the chamber a distance greater than the length of the product supports so that the product supports may freely pass between the rotatable bearing members permitting the flexible elements to follow the zig-zag path to and from one pair of rotatable bearing members to another and back again, with the product supports passing between the rotatable bearing members.

7 Claims, 6 Drawing Sheets

ZIG-ZAG PATH PROCESSING FACILITIES

FIELD OF THE INVENTION

The invention relates to processing facilities, for carrying product along a zig-zag path, during processing, and is particularly directed to such processing facilities wherein such path is located in a plurality of planes stacked one above the other.

BACKGROUND OF THE INVENTION

The processing of a wide variety of products involves passing them through processing facilities where they are required to dwell for a predetermined length of time during which such processing is carried out. Such processing facilities may be used for processing a wide variety of products including both food products and non-food products and including both meat products and other products, which may be processed prior to distribution and/or consumption.

The design of such processing facilities must take into account a variety of different requirements. In the first place, there is the dwell time, which is required for the complete processing of the product in the facility. Then there is the requirement for the maintaining of stable processing conditions within the processing facility, and throughout all areas of the processing facility. There is also the requirement for the easy maintenance and in particular the easy cleaning of such facilities after usage, to maintain them in a sterile condition.

Finally, there is the question of the cost of such facilities. One of the principal costs of such facilities is the total floor space occupied by the facilities. Clearly, facilities occupying a greater floor space, will occupy more real estate and thus increase the capital cost, than facilities which can be housed in a smaller space.

This factor will in many cases be dependant upon the volume of product which is required to be processed through the facilities during any given time, and the manner in which such product is to be conveyed into and removed from such processing facilities.

In the latter case, the designer is faced with two basic choices. Either on the one hand the products can simple be physically placed in a chamber, with the doors then being closed, and the product remains in the chamber for a predetermined dwell time, after which it is removed. This system is essentially similar to the cooking of products in a domestic oven, for example. Variations on this process have involved the stacking of products on large multiple product supports. The multiple product supports are then moved in step wise fashion through the processing facility or chamber, in a start/stop fashion.

However, where very large volumes of product are required to be processed on a more or less continuous basis, it is considered desirable to provide for a continuously moving conveyor system conveying the product continuously through the processing facilities or chamber. This greatly facilitates the operation of the preparation of the product prior to entry into the processing facility, and the removal of the product for packaging and the like after exiting from the processing facility The fact that the processing facility has continuously moving conveyor means, ensures that the equipment both upstream and downstream of the processing means can be operated continuously, and in timed synchronized relation to the operation of the conveyor, thus maximizing the efficiency of the entire operation.

In order to provide for a continuously operating conveyor, various considerations must be taken into account, namely the cross-sectional area of the chamber through which the products are being conveyed, which controls the actual volume of product per lineal foot of space, the dwell time or processing time required for any particular type of product, the number of different processing steps, requiring different processing conditions, along the length of the conveyor, to name only some of the considerations. Naturally, where the products must be processed in large volumes then either the speed of the conveyor will have to be relatively slow, or else the length of the chamber through which the product is conveyed will be excessively long. Alternatively, the chamber can have a larger cross-section so that it will handle a larger volume of products per lineal foot, but in this case special conveyor facilities will have to be provided for conveying the product through such a larger chamber. One approach which has been successfully used in the past is to provide an elongated processing chamber, laid out with a series S bends, so that the chamber is of generally sinusoidal shape in plan. A single rail conveyor runs throughout the length of the chamber, carrying product through the chamber. In this way it is possible to arrange for a chamber of considerable length, in a reasonably compact area.

However, one of the problems in this type of solution is the fact that the construction of the single rail conveyor means that the product must be carefully balanced on both sides of the single rail. The problem of sterilizing the conveyor after it has been used is also somewhat troublesome. In addition, where the S bends are located in the chambers, it is more difficult to maintain completely stable processing conditions, so that the processing conditions in some cases may vary from one side of the S to the other.

In addition, it is necessary to provide processing condition facilities such as fans, heaters, humidifiers, smoke generators, and the like and/or water spray or water deluge facilities, at various locations along the length of the conveyor, so as to maintain stable processing conditions along any given length or zone of the conveyor.

It is in fact known that it is less troublesome to maintain stable processing conditions within a processing chamber which has a larger cross-section or dimension, and is somewhat shorter in length.

In the past however, it has been generally considered that such large chambers of this type were not suitable for use with a continuously moving conveyor systems, but on the contrary, were suitable only for batch type start/stop conveyor systems.

In the particular case of processing food products, these considerations become increasingly acute. In food processing operations, standards and requirements for cleanliness and sterility increase from year to year. Accordingly, standards now require that the conveyor and the supports upon which the food products are supported on the conveyor, shall be thoroughly cleaned and sterilized once during each cycle of operation. Clearly this cleansing operation can take place only after the complete processing of a particular product has taken place and prior to loading with fresh product. Accordingly, it is now well understood that it is necessary to provide in such food processing facilities, cleansing and sterilizing facilities which are located between the unloading point, where fully processed product is unloaded, and the loading point where unprocessed product is loaded. When it is considered that the entire convey or system and the supports for the product, are moving continuously throughout, in order to gain the main advantages described above, it will be appreciated that the design of such a cleansing facility in a continuous line presents a number of problems including the further lengthening of the line.

Still another factor of importance in the design of such processing facilities particularly when processing food products such as meat, is that the processing usually involves a cooking step with or without smoking and other steps, followed eventually by a chilling step or process.

Particularly in the cooking stage and the chilling stage it is generally considered to be the preferred practice in the trade to progressively bring the products from their existing, i.e. room temperature, up to the cooking temperature over a period of time, and then to progressively chill the products from the cooking temperature down to an adequate degree of chilling for the purposes intended.

In order to do this, using the previously mentioned elongated processing chamber laid out with S bends, it was necessary to provide a large number of different controls for different zones of the chamber, and it was necessary that they all be carefully monitored and regulated so as to ensure that the right processing conditions were maintained in the right regions or zones of the chamber at all times.

Clearly, it is desirable to provide a processing facility for products, and particularly for meat or food products which is of compact space saving design, and which at the same time overcomes the various problems both of adequate production capacity process control at various stages of the processing, and washing and sterilization facilities.

BRIEF SUMMARY OF THE INVENTION with the view to satisfying the various foregoing conflicting requirements, the invention comprises a processing apparatus, for subjecting a plurality of products to predetermined process conditions, for predetermined lengths of time, said apparatus comprising, chamber means defining a processing chamber having side walls, a top and two ends, and process conditioning means for establishing a predetermined condition within and throughout said chamber means, a pair of continuous flexible conveyor elements, extending through said chamber means along a respective sides thereof, rotatable means on opposite sides of said chamber means for supporting said flexible elements in predetermined lengths, spaced one above the other, and spaced apart from one another, said flexible elements being arranged around respective said rotatable means, in a generally zig-zag path, product support means extending between said flexible elements, transversely thereto, and attachment means at each end of said products support means for attachment to respective said flexible elements, whereby said product support means are freely swingably supported between said flexible elements, and said rotatable means being spaced apart on opposite sides of said chamber means a distance greater than the length of said product support means, whereby said product support means may freely pass between said rotatable means, thereby permitting said flexible elements to follow said zig-zag path to and fro from one said rotatable means to the other and back again, with said product support means attached thereto and passing between said rotatable means.

The invention further comprises such a processing apparatus and wherein the product support means comprise a substantially rigid bar member adapted to be supported at each of its ends, on respective said flexible elements, whereby to span the space between said flexible elements, and a plurality of arm members secured to said bar, in spaced apart relation, and defining supports for said product.

The invention further comprises such a processing apparatus and wherein said flexible elements comprise chains, and wherein said rotatable means comprise sprockets, secured to said side walls of said chamber means in registration with one another, whereby said chains may run in a continuous generally zig-zag pathway around said sprockets on opposite said side walls, with said product supports extending therebetween.

The invention further comprises such a processing apparatus wherein said chamber means comprises two chambers arranged end for end, and including partition means separating one of said chambers from the other, said partition means extending from said top wall downwardly and having upper and lower ends, and including opening means at a lower end of said partition means, and wherein said flexible elements extend through said opening means.

The invention further comprises such a processing apparatus wherein both said chamber means are provided with rotatable means at each end thereof, with said flexible elements extending around said rotatable means, and defining a continuously ascending zig zag pathway from the bottom to the top of each of said chambers, and including a substantially vertical portion of said flexible elements extending from an upper region of a first one of said chambers, to a lower region thereof, and passing through said opening means in said partition means, and wherein, in said second chamber, there is a further substantially vertical portion of said flexible elements extending from the top of said chamber downwardly towards the lower portion thereof, and including opening means in the end walls of said first and second chambers, with portions of said flexible elements extending through said opening means, whereby product may be loaded onto said support means at one end of said first chamber, and may be removed from said support means at the other end of said second chamber.

The invention further comprises such a processing apparatus and wherein process conditioning means are provided in both said chambers, for establishing predetermined processing conditions therein.

The invention further comprises such a processing apparatus wherein said processing conditions in said first chamber establish a predetermined elevated temperature, for cooking product on said support means, and wherein said processing conditioning means and said second chamber define a predetermined reduced temperature for chilling products cooked in said first chamber.

The invention further comprises such a processing apparatus and wherein the process conditioning means in both said chambers comprise high mass flow water deluge means, located in the top of each of said chambers, and operable to discharge a high mass flow of water downwardly around products passing upwardly through said chambers.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
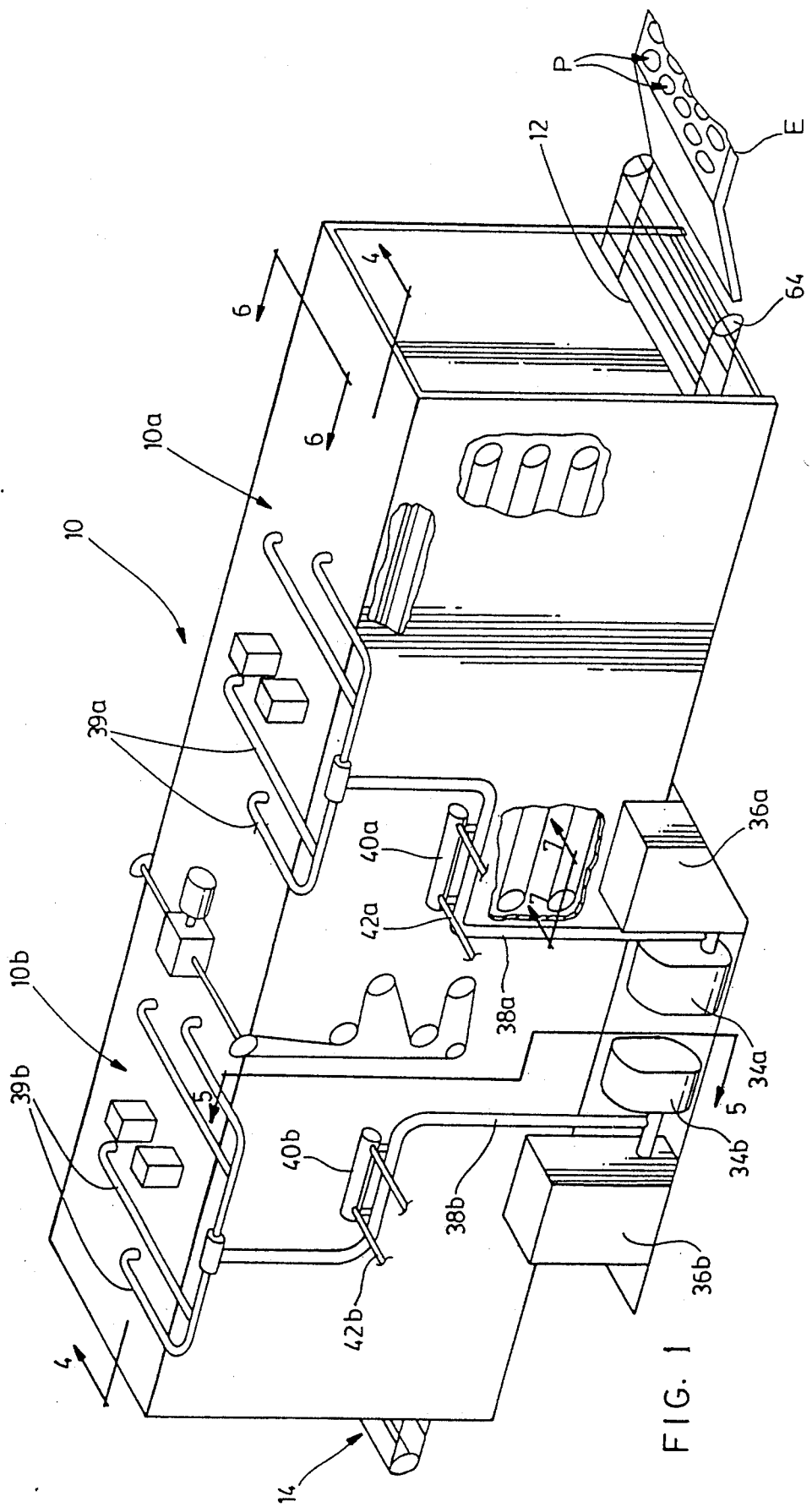
FIG. 1 is a perspective illustration partially cut away, illustrating the processing apparatus in accordance with the invention.
Figure 2:
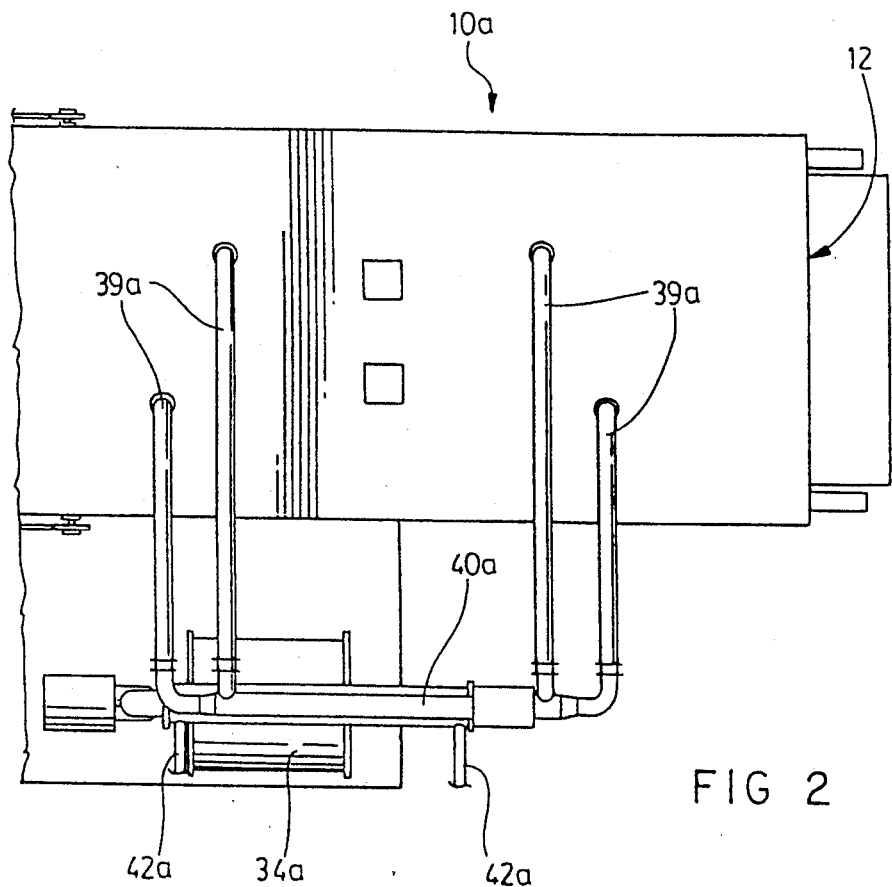
FIG. 2 is a top plan view of a portion of the processing apparatus of FIG. 1.
Figure 3:
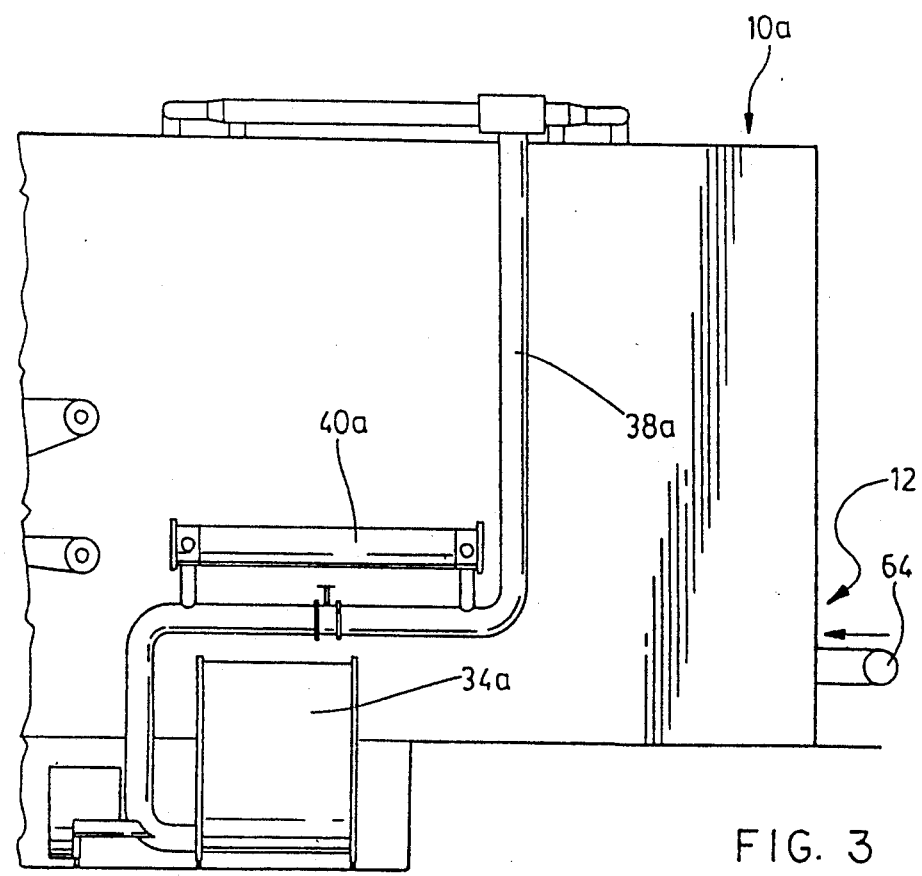
FIG. 3 is a side-elevational view of the same portion of the processing apparatus, as shown in FIG. 2.
Figure 4:
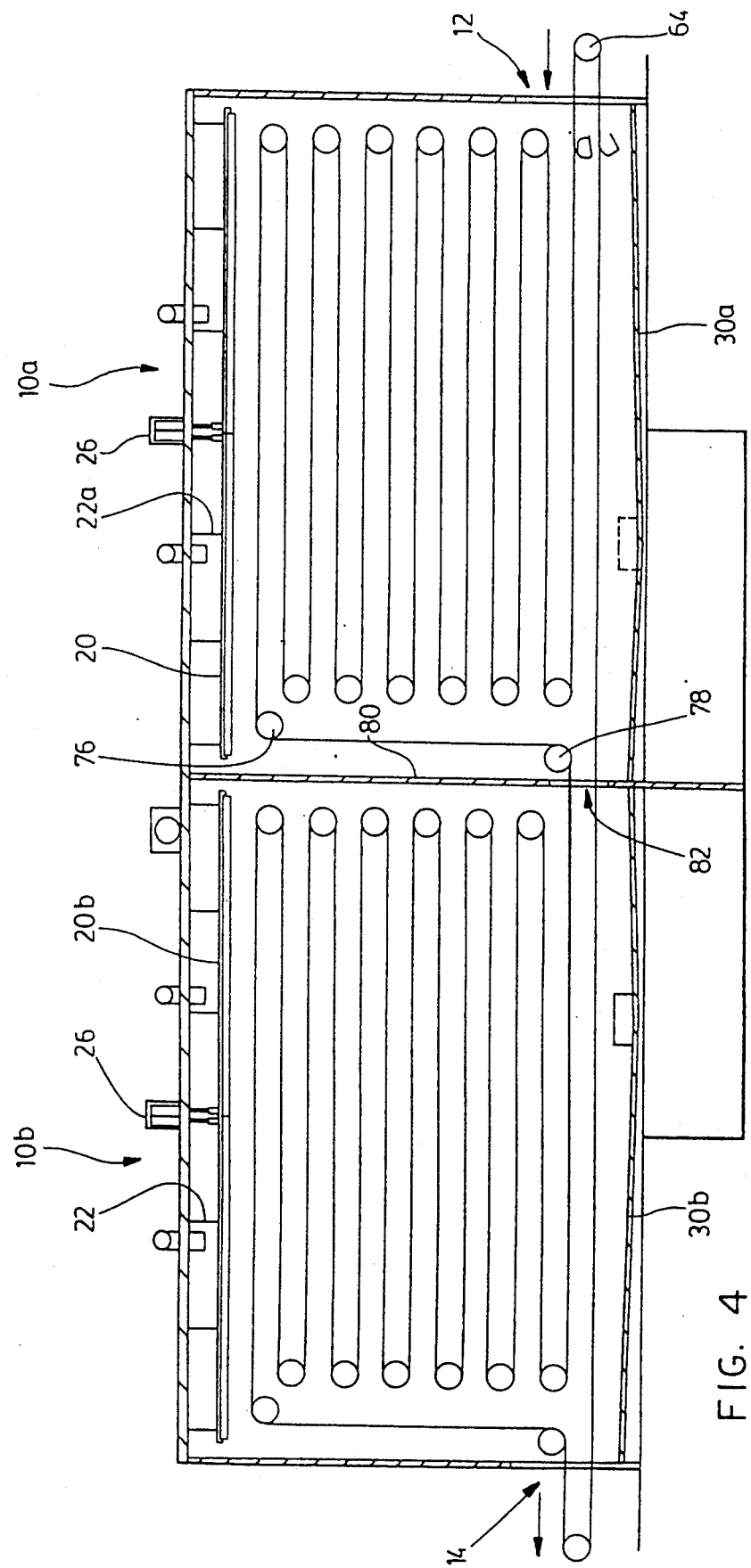
FIG. 4 is a sectional illustration along the line 4—4 of FIG. 1.
Figure 5:
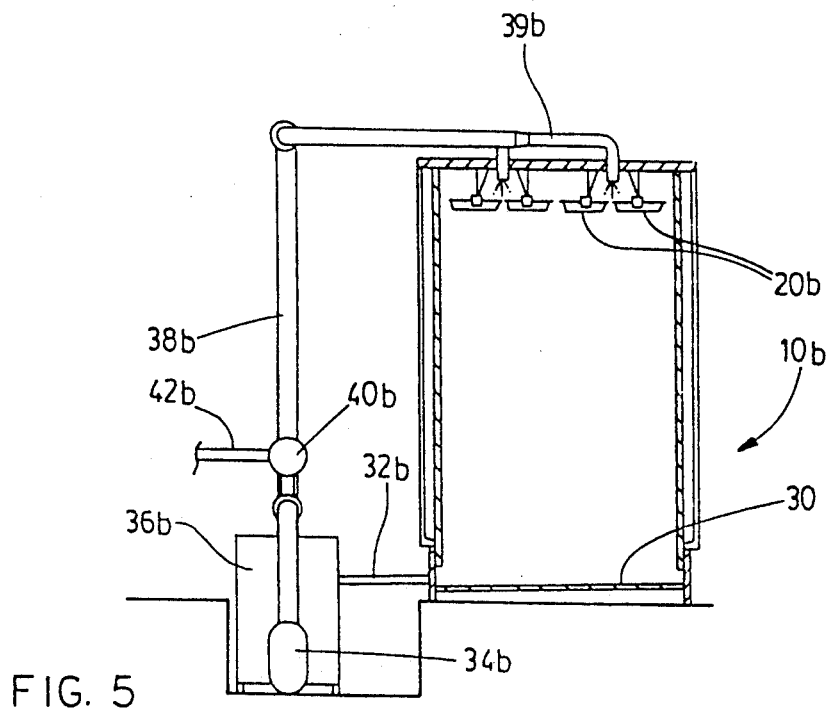
FIG. 5 is a schematic section along line 5—5 of FIG. 1.
Figure 6:
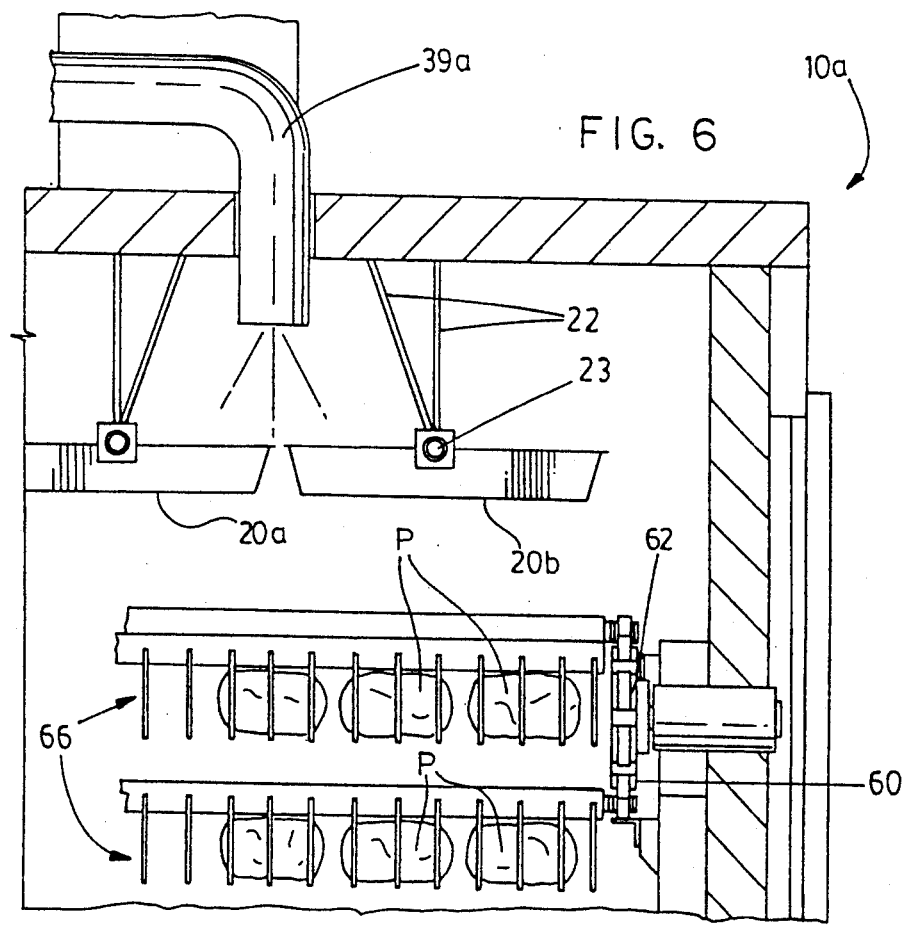
FIG. 6 is an enlarged section along line 6—6 of FIG. 1.

Referring first of all to FIG. 1, it will be seen that the embodiment of the invention as illustrated here, for the purposes of explanation only and without limitation, is shown as comprising a generally rectangular-shaped chamber means, in which the processing steps required for processing a product, are carried out.

As explained above, a wide variety of different products may be required to be processed. A wide variety of different processing steps may be required for processing different types of products. In the case of the present embodiment, the product is in the form of a meat product. The meat product in this particular case comprises portions of pork carcasses, which portions are intended to be processed in this case by simply cooking and chilling, to provide cooked hams. It will however be appreciated that this is merely one example of the processing of meat products, and that meat itself is merely one example the type of product which may require to be processed, and that many other products which may be food or non-food products may be also be required to be processed. The illustration of the invention therefore in connection with the processing of pork sections into hams is given here purely by way of example and without limitation.

In FIG. 1, such meat products are illustrated by the general reference arrow p. It will be of course appreciated that, in accordance with well-known industry practice, cooked ham products of this type are usually, but not invariably, sections of pork, which may or may not have been processed with the injection or addition of brine or other materials, and which sections are then packed into containers. Such containers (not shown) may be either in the form of skins, in some cases, but more usually will be in the form of boxes or containers made of metal, typically stainless steel. In many cases, such containers are cylindrical. In other cases however the containers may be of rectangular shape in section. The end result however will be the relatively familiar cooked ham product such as is widely used in the making of for example sandwiches or fast food products. Typically, it will be sliced, and packaged in pre-weighed packages for sale in retail establishments, supermarkets and the like. In other cases it may be sold in bulk to fast food outlets such as sandwich retailers, institutions and the like.

Various different makes and shapes of such containers are available on the market, and are well-known in the art, and description of any specific container is therefore believed to be superfluous for the purposes of this description.

It will however be appreciated that the invention is not confined solely to the processing of meat products which are packaged into such containers, but is also applicable to the processing of "bone-in" hams, or sausage products, which are customarily processed in various different ways, and of course is applicable to other food products, and a variety of non-food products.

Bearing mind these preliminarily remarks, it will be seen that the chamber 10 of FIG. 1 comprises a first zone 10a for cooking, and a second zone 10b for chilling. The two zones merely form part of a common continuous chamber. It will however be appreciated that the two zones could be entirely separate from one another if desired, merely being connected by means of a conveyor to be described below.

It will also be appreciated that while the chamber 10 is shown here as comprising two zones, it could easily comprise three, four, or five zones depending on the various different processing steps to be carried out. Thus some meat products require to be cooked at different temperature levels, in sequence, and some meat products require simply to be what is known as "tempered" without actual cooking, and still other meat products require to be smoked with or without cooking.

While chilling is a usual final stage, some meat products may not require chilling, and may simply be shipped out directly, or may be suitable for storage at ambient temperatures.

The illustration of the chamber 10 as having two zones 10a and 10b is therefore merely for the purposes of illustration, and without in any way limiting the invention thereto.

The first or cooking zone 10a has an entry opening 12, and the second or chilling zone 10b has an exit opening 14.

In order to deliver products P to the upstream end 12, from other processing or preparing facilities in the plant any suitable conveyor (not shown) may be provided. Typically this conveyor will be an inline conveyor, with an end section E, where the products are formed into rows, for example in this case, rows of five meat products P one beside the other, transverse to the axis of the conveyor.

Downstream of the chilling chamber 10b, past the exit 14, a further conveyor (not shown) will be provided for conveying the processed products P away from the chamber 10

In order to cook (or otherwise process) products in the chamber zone 10a a process conditioning means, in this case, a hot water circulation system, is employed. This system produces a massive deluge of a continuous flow of hot water downwardly from the top of the chamber 10 towards the bottom. The water will flow over and around all of the product within the chamber, and heat the products progressively to a predetermined temperature thereby causing the necessary cooking process.

It will however be appreciated that other cooking processes could be carried out and heating could be carried out in ways other than by a water deluge. Steam heating, air heating, radiant heating, microwave heating and the like are all known in the art, and could be substituted for the water deluge system illustrated herein in certain cases, if desired.

As illustrated in FIGS. 2, 3, 4, and 5, the water deluge system comprises a plurality of water distribution trays 20, mounted in an upper region of the chamber zones 10a, 10b and suspended on rods 22. The trays 20 are normally horizontal, and are provide with a large plurality of distribution openings (not shown) through which water may simply pour downwardly in a massive deluge, over the full cross sectional area of the zones 10a 10b.

Figure 10:
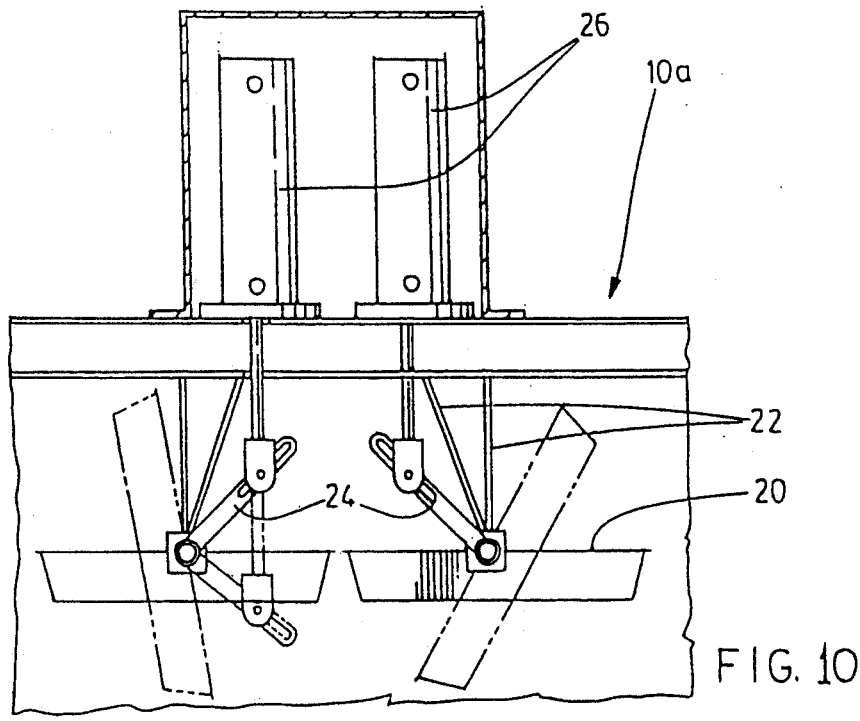

For purposes which will become apparent as this description proceeds, the trays are mounted on bearings 23 and may be tilted to one side for cleaning. Any suitable operating mechanism such as crank arms 24 (FIG. 10), and power operated cylinder means 26 may be provided, by means of which the trays may be tilted (as shown in phantom in FIG. 10).

At the lower portion of the chamber zones 10a, 10b there are provided collection wells 30a, 30b for the collection of water flowing downwardly from the trays in the respective zones connected by means of respective conduit 32a–b to respective pumps 34a–b, driven by respective motors 36a–b. Return conduits 38a–b connect respective pumps to the top of the respective zones 10a-10b and distribution conduits 30a–b distribute the water back to the trays.

In this way a continuous circulation of water from top to bottom and from bottom to top is achieved to procure the necessary high volume water deluge, in each zone.

In order to heat or cool, the water and control its temperature, respective heat exchanger 40a–b are coupled to conduits 38a–b.

Heat exchangers 40a–b are coupled by respective 42a–42b to a heating/cooling source (not shown) which may be available in a particular plant, for heating or cooling such heat exchangers.

As the water passes through the heat exchanger, it is thus heated (or cooled) to the appropriate temperature.

In order to control the temperature of the water, valves 44a–b are provided at the connection between the heat exchangers and the main conduits 38a–b. By suitable power operated controls, the valves may be automatically regulated and controlled, so that more or less of the water passing through the conduits 38 is bypassed through the heat exchangers, or is alternatively bypassed around then, so that in this way the temperature of the water reaching the trays may be closely regulated.

A suitable electronic process controller is consisting typically of a CPU, a monitor, and a keyboard (not shown) of a type well-known in the art and requiring no special description will be provided. It is connected by suitable sensors (not shown) to conduits 38, and to valves 44, for operation thereof.

In this way, the process water pouring downwardly from the trays, may be maintained at a more or less precise set point temperature in each zone. In fact the temperature variation between the water at the top and the bottom of each chamber zone may thus be controlled so that the temperature variation is no more than about two degrees.

In order to move the meat products P through the zones 10a–b a continuous conveyor is provided, which comprises a pair of conveyor chains 60—60, running in a generally zig-zag fashion, from one end to the other of respective zone 10a-10b of chamber 10. Sprockets 62—62 are provided around which the chains may run. Chains 60 have rollers 63 to facilitate their movement.

The location of the sprockets on opposite sides of the zones 10a–b of the chamber will register with one another, so that the chains are arranged in a series of generally horizontal runs, on opposite sides of each chamber zone, being parallel with one another, and lying in common planes spaced one above the other. If desired, the planes may be angled slightly, by altering the location of the centres of the sprockets, in a manner which will be apparent from an examination of FIG. 2. However in most cases the runs of the chains will be essentially along horizontal planes.

If necessary, idler rollers (not shown) at spaced locations between the sprockets may be provided, to provide additional support for the chains.

At the input end of the zone 10a, a portion of the two chains is extended outwardly through opening 12, and run around sprockets 64. Sprockets 64 are located adjacent the end of the conveyor end section E Consequently, products arriving at the end of conveyor E are then available to be picked up and transferred to carrier means on the conveyor, yet to be described and carried on the two chains.

In order to carry meat products P, carrier means 66 are provided on the two chains. A plurality of such carrier means 66 are provided at spaced apart intervals extending between opposite runs of the chains. Thus as the chains move around the sprockets, through the zones, the carrier means 66 are carried with the chains along a continuous progressive movement path.

Figure 7:
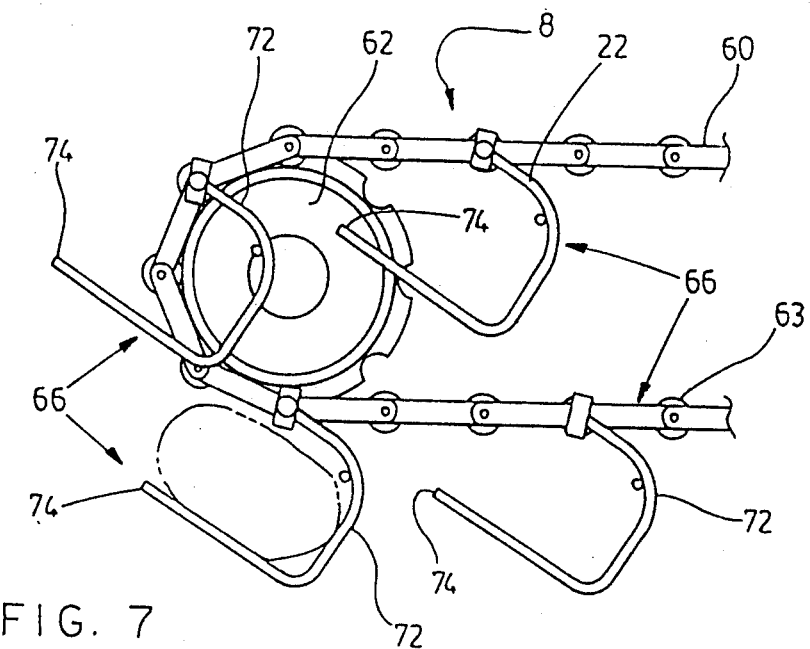
FIG. 7 is an enlarged side elevation along the line 7—7 of FIG. 1, and illustrating portions of the product support means.
Figure 8:
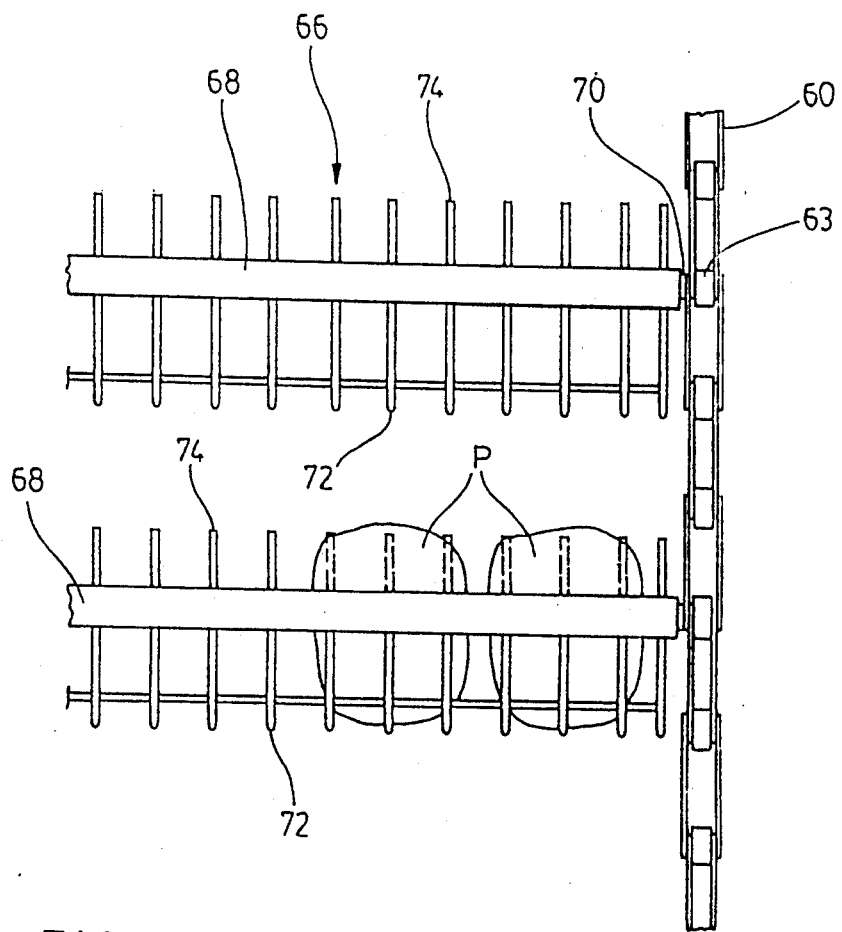
FIG. 8 is top plan view of the product support means of FIG. 7 viewed from the arrow 8 of FIG. 7.
Figure 9:
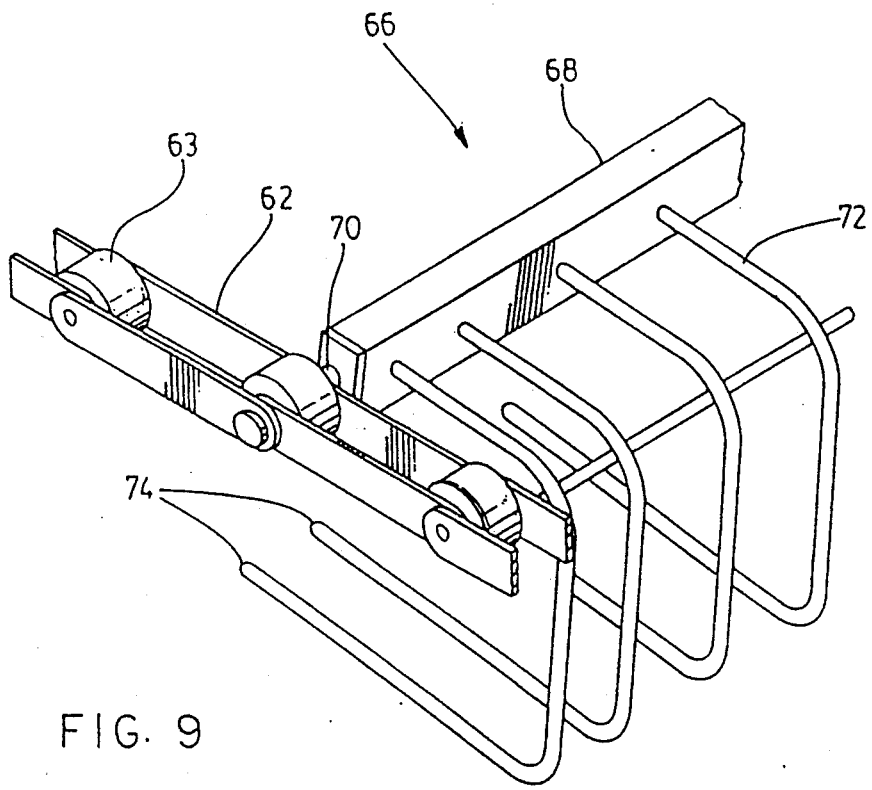
FIG. 9 is an enlarged perspective illustration of the product support means and showing one of the flexible element conveyor means, and, FIG. 10 is a section along the line 10—10 of FIG. 4 showing a moveable process control means, with one position in phantom.

As will be seen from FIGS. 7, 8 and 9, each of the carrier means 66 comprises a generally transverse bar 68 supported at each end on bearings 10 carried on respective chains. Located at spaced intervals along the bar 68 are a plurality of generally U-shaped hook members 72 Each of the hook members has one fixed end secured to the bar, and a free end 74 extending in a U-shaped manner away from the bar.

The U-shaped members 72, as they pass around the sprockets 64 adjacent the end of conveyor E, are adapted to pass between portions of the conveyor E and thus pick up the meat products P located on conveyor E, and carry them away from conveyor E and into the zone 10a.

It will be appreciated that the U-shaped members 72 are formed so that their centre of gravity is such that they hang with their free ends or prongs 74 pointed normally, more or less upwardly, or at least at an upwardly directed angle. Thus as the prongs pass between the end portions of the conveyor E, they can as it were "scoop" the meat products P upwardly up off the conveyor E, and entrap them within the U-shaped members.

The chains will then convey the carriers back into the entrance end 12 of the chamber zone 10a. At this point, they will be at the lower most location within the zone 10a, and will move transversely from one side to the other along a more or less, but not necessarily precisely horizontal path. As they do so, water pouring downwardly from the trays 20 will flow around such products P. Such water in zone 10a being at an elevated temperature will commence heating of such products P. The movement of the conveyor chains will cause the product supports to traverse across the chamber from one side to the other, and when they reach the sprockets, at the far end of the chamber zone 10a the chains will then traverse around the sprockets 62. However the sprockets are spaced further apart than the length of the carriers 66, and thus the product supports can simply move with the chains, between the sprockets. They will then traverse back again across the chamber zone in the opposite direction. This zig-zag movement will continue until the carriers 66 reach the top of the chamber zone. By this time, they will have been subjected to repeated to and fro zig-zag passes through the continuous deluge of hot water passing downwardly from the top of the chamber zone. By arranging for a suitable movement speed of the conveyor chains, and by arranging for a suitable spacing of the carriers 66 on the conveyor chains 60, the products P will spend sufficient time within the chamber zone 10a, to have been raised to the necessary temperature for the necessary period of time, and thus to have been completely cooked, or otherwise processed, depending on the process being carried on within the chamber zone 10a.

Obviously the actual dwell time of the products P within the chamber zone can be varied or regulated by such various factors as the design of the chamber, the number of runs of zig-zag chain within the chamber, the speed of movement of the chain, and the number of carriers 66 mounted on the chains and length of chamber. All of these factors will of course be taken into account when the original system is designed. If it is required to provide a system having greater flexibility, then the speed of the chain can be varied, and perhaps different systems can be provided than simply the water deluge system for providing different processing conditions within the chamber zones. In any event, once the products reach the top of the chamber zone 10a, they then exit around sprockets 76-78. The two chains extend more or less perpendicularly between sprockets 76-78, thereby carrying all of the carriers 66 downwardly, substantially between the two zones 10a and 10b of the chamber 10.

Wall 80 separates zone 10a from zone 10b. Chains 60 pass into zone 10b through opening 82 at the lower end of wall 80.

The construction of the chamber zone 10b is in many ways similar to 10a. That is to say it is provided with means for processing the product in zone 10b, which in this case simply consists of chilling the products P. Such processing means in this embodiment again comprises a plurality of trays 20b swingably supported (as in chamber 10a), so that they may be tilted and cleaned.

Similarly, water circulation means in the form of a collection well 30b, conduit, pump and motor 34b-36b, and, and return conduit 38b are all provided. Heat exchanger 40b is also connected to the conduit 38b, connected to a suitable source of a coolant medium. Typically, the water circulating within the coolant system will have some form of chemical added to the water, in order to enable water to be maintained at a low temperature i.e. below the freezing point water, and remain liquid. Typically, when processing food products such chemical will simply be salt, so that the water circulating in Zone 10b will be a mixture of salt and water, or what is known as "brine".

However, if processing of non-food products is carried out, some other form of additive, may be added to the water, provided it is not incompatible with whatever products being processed.

It will of course be appreciated that while Zones 10a and 10b are illustrated here in the form of a first cooking zone and a second chilling zone, there may be several such zones, carrying out several different treatments on the products, in which case they would be connected essentially as the same way as the Zones 10a and 10b are shown in the present explanation.

While the processing facilities for both zones in this case are shown as being water deluge processing facilities, it will be appreciated that other forms of processing facilities might replace them. Such other facilities might include hot air or smoke, or tempered air i.e. air kept at a predetermined temperature and humidity range, or might be chilled air. All these different processing systems are well known in the art and require no special description.

The method according to the invention, will be self-evident from the foregoing description of the operation of the processing apparatus.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A processing apparatus for subjecting a plurality of products to predetermined process conditions, for predetermined lengths of time, said apparatus comprising;

chamber means defining a processing chamber having side walls and a top, and two ends, and process conditioning means for establishing a predetermined condition within and throughout said chamber means;

a pair of continuous flexible conveyor elements, extending through said chamber means along a respective sides thereof;

rotatable means on opposite sides of said chamber means for supporting said flexible elements in predetermined lengths spaced one above the other, and spaced apart from one another, said flexible elements being arranged around respective said rotatable means, in a generally zig-zag path;

product support means extending between said flexible elements, transversely thereto, and, attachment means at each end of said products support means for attachment to respective said flexible elements, whereby said product support means are freely swingably supported between said flexible elements, and said rotatable means being spaced apart on opposite sides of said chamber means a distance greater than the length of said product support means, whereby said product support means may freely pass between said rotatable means, thereby permitting said flexible elements to follow said zig-zag path to and from end of said rotatable means to the other and back again, with said product support means attached thereto and passing between said rotatable means.

2. A processing apparatus claimed in claim 1 and including at least one further said chamber means defining a product processing chamber, and process conditioning means for said further chamber means, and said pair of continuous flexible conveyor elements extending through said further chamber means along respective sides thereof, around rotatable means on opposite sides of said further chamber means, whereby successive runs of said flexible elements cross and re-cross said further chamber means progressively upwardly within said further chamber means, and an end wall of said further chamber means defining an exit opening means at a lower region thereof, and rotatable means, in an upper region and a lower region of said further chamber means adjacent said end wall, around which said continuous flexible elements run, and said flexible elements extending outwardly through said opening means.

3. A processing apparatus claimed in claim 1 and wherein said process conditioning means comprises a hot water deluge system, said system in term comprises water distribution ray means located in the upper region of said chamber means and opening means therein, whereby water may stream downwardly, water supply means for supplying large volumes of water to said water tray means continuously, heat exchange means associated with said water supply means, whereby to maintain the temperature of said water at or close to a predetermined set point, pump means for pumping water from the interior of said chamber upwardly through said supplying means, and through said heat exchange means, to said tray means, whereby to procure continuous circulation of water from the bottom of said chamber through said water supply means back to said tray means.

4. A processing apparatus claimed in claim 1, wherein said product support means comprise a plurality of bar means defining two ends, and rotatable attachment means securing respective said ends to respective said flexible elements, at spaced intervals therealong, and a plurality of hook means secured at spaced intervals along each said bar means, said hook means defining fixed end secured to said bar means and free ends extending therefrom, and being shaped and adapted to support product therein.

5. A processing apparatus claimed in claim 2, and including transfer opening means between said first chamber means and said further chamber means, adjacent a lower region thereof, and including upper rotatable means located at a upper region of said first chamber means and lower rotatable means located therein adjacent said transfer opening, said flexible elements extending around said upper and lower rotatable means, whereby the same extend substantially vertically from an upper region of said first chamber means to a lower region of said first chamber means, and then pass through said transfer opening means to said further chamber means.

6. A processing apparatus claimed in claim 3, wherein said tray means comprises a plurality of elongated tray members, and support hangers for hanging said tray members, and pivotal connection means on said tray members connecting same to said hanger members, whereby said tray members may be swung between a substantially vertical position and horizontal position, and including power operated members for moving said tray members between their respective positions.

7. A processing apparatus claimed in claim 2, wherein said process conditioning means for said further chamber means comprises tray means in an upper region of said further chamber means, and openings in said tray means for downward flow of water throughout said further chamber means, water supply means for supplying large volumes of water continuously to said tray means, heat exchange means connected to said supply means, whereby the temperature of said water passing therethrough may be chilled, and collector means and pump means, for collecting water from a lower region of said chamber and pumping the same upwardly through said supply means and said heat exchanger for delivery to said tray means.

* * * * *